(12) United States Patent
Shost et al.

(10) Patent No.: US 10,233,796 B2
(45) Date of Patent: Mar. 19, 2019

(54) INTERNAL COMBUSTION ENGINE USING VARIABLE VALVE LIFT AND SKIP FIRE CONTROL

(71) Applicant: Tula Technology, Inc., San Jose, CA (US)

(72) Inventors: Mark A. Shost, Northville, MI (US); Matthew A. Younkins, San Jose, CA (US)

(73) Assignee: Tula Technology, Inc., San Jose, CA (US)

( * ) Notice: Subject to any disclaimer, the term of this patent is extended or adjusted under 35 U.S.C. 154(b) by 0 days.

(21) Appl. No.: 14/705,712

(22) Filed: May 6, 2015

(65) Prior Publication Data

US 2015/0322869 A1 Nov. 12, 2015

Related U.S. Application Data

(60) Provisional application No. 61/991,767, filed on May 12, 2014.

(51) Int. Cl.
*F01L 1/14* (2006.01)
*F01L 1/18* (2006.01)
(Continued)

(52) U.S. Cl.
CPC .......... *F01L 13/0026* (2013.01); *F01L 1/146* (2013.01); *F01L 1/344* (2013.01); *F01L 13/0005* (2013.01);
(Continued)

(58) Field of Classification Search
CPC ...... F02D 41/0087; F02D 17/02; F02D 17/04; F02D 13/00; F02D 13/06;
(Continued)

(56) References Cited

U.S. PATENT DOCUMENTS 4,434,767 A 3/1984 Kohama et al.
4,489,695 A 12/1984 Kohama et al.
(Continued)

FOREIGN PATENT DOCUMENTS

DE EP 0980965 A2 * 2/2000 .......... F01L 13/0005
EP 2669495 * 12/2013 ............. F02D 13/06
(Continued)

OTHER PUBLICATIONS

International Search Report dated Sep. 3, 2015 from International Application No. PCT/US 15/29543.
(Continued)

*Primary Examiner* — Sizo B Vilakazi
*Assistant Examiner* — Brian R Kirby
(74) *Attorney, Agent, or Firm* — Beyer Law Group LLP

(57) ABSTRACT

An internal combustion engine capable of cylinder deactivation or skip fire control in combination with variable valve lift control. One bank of cylinders can be deactivated while the air induction of the other bank of cylinders is regulated using variable valve lift control to increase engine efficiency. An internal combustion engine with two cylinder banks, where control of one cylinder bank using skip fire control can be operating at an appropriate firing fraction in combination with variable valve lift control on the other cylinder bank. A single bank of cylinders can be controlled in a skip fire manner in conjunction with variable valve lift control.

20 Claims, 11 Drawing Sheets

(51) Int. Cl.
*F01L 1/34* (2006.01)
*F01L 1/344* (2006.01)
*F01L 13/00* (2006.01)
*F02D 17/02* (2006.01)
*F02D 41/00* (2006.01)
*F02D 41/30* (2006.01)

(52) U.S. Cl.
CPC ......... *F02D 17/02* (2013.01); *F02D 41/0002* (2013.01); *F02D 41/0082* (2013.01); *F02D 41/0085* (2013.01); *F02D 41/0087* (2013.01); *F01L 1/181* (2013.01); *F01L 1/34* (2013.01); *F01L 2013/001* (2013.01); *F01L 2013/0068* (2013.01); *F01L 2013/0073* (2013.01); *F01L 2105/00* (2013.01); *F01L 2800/08* (2013.01); *F01L 2820/01* (2013.01); *F02D 2041/0012* (2013.01); *Y02T 10/42* (2013.01)

(58) Field of Classification Search
CPC ........... F02D 2013/005; F02D 13/0203; F02D 13/0207; F02D 13/0211; F02D 13/04; F02D 41/0082; F02D 41/0002; F02D 41/0085; F02D 2041/0012; F02B 3/06; F02M 1/24; F01L 13/0026; F01L 1/146; F01L 13/0005; F01L 1/344; F01L 2820/01; F01L 2013/0073; F01L 1/181; F01L 1/34; F01L 2013/001; F01L 2105/00; F01L 2800/08; F01L 2013/0068; Y02T 10/42
USPC ........ 123/179.3, 179.4, 481, 198 F, 198 DB, 123/198 DC
See application file for complete search history.

(56) References Cited

U.S. PATENT DOCUMENTS

| | | | |
|---|---|---|---|
| 4,509,488 A | | 4/1985 | Forster et al. |
| 4,592,315 A | | 6/1986 | Kobayashi et al. |
| 4,991,558 A | * | 2/1991 | Daly ........................ F02D 17/02 123/481 |
| 5,117,790 A | | 6/1992 | Clarke et al. |
| 5,129,407 A | | 7/1992 | Phillips et al. |
| 5,154,151 A | * | 10/1992 | Bradshaw ............... B60K 28/16 123/198 F |
| 5,377,631 A | * | 1/1995 | Schechter ................. F01L 9/02 123/198 F |
| 5,597,371 A | | 1/1997 | Toukura |
| 5,617,829 A | * | 4/1997 | Bidner ................ F02D 41/0087 123/481 |
| 5,713,315 A | * | 2/1998 | Jyoutaki ................... F01L 9/02 123/568.26 |
| 5,743,221 A | | 4/1998 | Schmitz |
| 5,836,274 A | | 11/1998 | Saito et al. |
| 6,158,411 A | | 12/2000 | Morikawa |
| 6,343,581 B2 | | 2/2002 | Suzuki |
| 6,382,193 B1 | | 5/2002 | Boyer et al. |
| 6,443,125 B1 | | 9/2002 | Mendler |
| 6,484,677 B2 | | 11/2002 | Leone et al. |
| 6,571,771 B2 | | 6/2003 | Doering et al. |
| 6,600,989 B2 | | 7/2003 | Sellnau et al. |
| 6,619,258 B2 | | 9/2003 | McKay et al. |
| 6,647,947 B2 | * | 11/2003 | Boyer ........................ F01L 1/34 123/198 F |
| 6,805,095 B2 | | 10/2004 | Sun et al. |
| 6,866,020 B2 | | 3/2005 | Allston et al. |
| 7,058,501 B2 | | 6/2006 | Yasui et al. |
| 7,063,062 B2 | | 6/2006 | Lewis et al. |
| 7,066,136 B2 | | 6/2006 | Ogiso |
| 7,072,758 B2 | * | 7/2006 | Kolmanovsky ........... F01L 9/04 123/198 F |
| 7,086,386 B2 | | 8/2006 | Doering |
| 7,128,044 B1 | | 10/2006 | Doering et al. |
| 7,140,355 B2 | | 11/2006 | Michelini et al. |
| 7,146,966 B2 | | 12/2006 | Nakamura |
| 7,167,792 B1 | * | 1/2007 | Kolmanovsky ........ F02M 27/02 123/345 |
| 7,249,583 B2 | | 7/2007 | Bidner et al. |
| 7,249,584 B2 | | 7/2007 | Rozario et al. |
| 7,260,467 B2 | | 8/2007 | Megli et al. |
| 7,377,260 B2 | | 5/2008 | Jehle et al. |
| 7,426,915 B2 | | 9/2008 | Gibson et al. |
| 7,503,312 B2 | | 3/2009 | Surnilla et al. |
| 7,562,530 B2 | * | 7/2009 | Kolnnanovsky .......... F01L 9/04 60/600 |
| 7,577,511 B1 | * | 8/2009 | Tripathi ............... F02D 41/0087 701/103 |
| 7,603,972 B2 | | 10/2009 | Han et al. |
| 7,757,657 B2 | | 7/2010 | Albertson et al. |
| 7,765,806 B2 | | 8/2010 | Clark |
| 7,801,691 B2 | | 9/2010 | Panciroli et al. |
| 7,849,835 B2 | * | 12/2010 | Tripathi ............... F02D 41/0087 123/350 |
| 7,908,913 B2 | | 3/2011 | Cinpinski et al. |
| 7,930,087 B2 | | 4/2011 | Gibson et al. |
| 7,950,359 B2 | | 5/2011 | Choi |
| 7,954,474 B2 | * | 6/2011 | Tripathi ............... F02D 41/0087 123/350 |
| 8,028,665 B2 | | 10/2011 | Ralston |
| 8,061,318 B2 | | 11/2011 | Cleary et al. |
| 8,099,224 B2 | * | 1/2012 | Tripathi .................. F02D 17/02 123/478 |
| 8,131,445 B2 | | 3/2012 | Tripathi et al. |
| 8,131,447 B2 | * | 3/2012 | Tripathi ............... F02D 41/0087 123/198 F |
| 8,215,099 B2 | | 7/2012 | Ono et al. |
| 8,286,471 B2 | * | 10/2012 | Doering .................. F01L 13/00 73/114.79 |
| 8,312,849 B2 | | 11/2012 | Roe et al. |
| 8,347,857 B2 | | 1/2013 | Cleary et al. |
| 8,402,942 B2 | | 3/2013 | Tripathi et al. |
| 8,468,987 B2 | * | 6/2013 | Kirchweger ............... F01L 1/34 123/90.15 |
| 8,473,179 B2 | | 6/2013 | Whitney et al. |
| 8,499,743 B2 | | 8/2013 | Tripathi et al. |
| 8,511,281 B2 | * | 8/2013 | Tripathi .................. F02D 17/02 123/481 |
| 8,631,646 B2 | | 1/2014 | Smith et al. |
| 8,701,628 B2 | * | 4/2014 | Tripathi .................. F02D 37/02 123/350 |
| 8,789,502 B2 | | 7/2014 | Barnes |
| 8,839,766 B2 | * | 9/2014 | Serrano ............... F02D 41/0087 123/198 DB |
| 8,892,330 B2 | | 11/2014 | Yuille et al. |
| 8,931,444 B2 | | 1/2015 | McConville et al. |
| 9,086,020 B2 | | 7/2015 | Pirjaberi et al. |
| 9,399,964 B2 | | 7/2016 | Younkins et al. |
| 9,476,373 B2 | | 10/2016 | Younkins et al. |
| 2001/0023686 A1 | * | 9/2001 | Okamoto ................. F02B 31/06 123/490 |
| 2001/0035141 A1 | * | 11/2001 | Pierik .................. F01L 13/0063 123/90.16 |
| 2002/0096134 A1 | | 7/2002 | Michelini et al. |
| 2003/0062019 A1 | * | 4/2003 | Schaefer-Siebert ...... F02D 9/02 123/198 F |
| 2003/0230280 A1 | * | 12/2003 | Allston .................... F02D 9/08 123/403 |
| 2004/0182340 A1 | * | 9/2004 | Cecur .................... F01L 1/185 123/90.16 |
| 2004/0237949 A1 | * | 12/2004 | Yasui ...................... F02B 39/04 123/559.1 |
| 2005/0000480 A1 | | 1/2005 | Yasui et al. |
| 2005/0045156 A1 | * | 3/2005 | Yokoi ...................... F02D 13/06 123/481 |
| 2005/0150561 A1 | | 7/2005 | Flynn et al. |
| 2005/0161023 A1 | * | 7/2005 | Albertson ........... F02D 41/0087 123/399 |
| 2005/0193720 A1 | | 9/2005 | Surnilla et al. |
| 2005/0199220 A1 | | 9/2005 | Ogiso |

(56) References Cited

U.S. PATENT DOCUMENTS

| | | | |
|---|---|---|---|
| 2005/0268880 A1 | 12/2005 | Bidner et al. | |
| 2005/0284438 A1* | 12/2005 | Hasebe | F01L 1/267 123/198 F |
| 2006/0020386 A1* | 1/2006 | Kang | F02D 13/0249 701/114 |
| 2006/0037578 A1* | 2/2006 | Nakamura | F01L 1/185 123/198 F |
| 2006/0101903 A1* | 5/2006 | Moninger | F02D 41/222 73/114.16 |
| 2006/0169231 A1* | 8/2006 | Fuwa | F01L 1/34 123/90.15 |
| 2006/0180119 A1* | 8/2006 | Winstead | F01L 9/04 123/198 F |
| 2006/0236960 A1* | 10/2006 | Nakamura | F01L 1/3442 123/90.15 |
| 2007/0006831 A1* | 1/2007 | Leone | F01L 13/0005 123/90.15 |
| 2007/0012283 A1* | 1/2007 | Rockwell | F02D 41/064 123/299 |
| 2007/0131196 A1* | 6/2007 | Gibson | F01L 1/38 123/198 F |
| 2007/0157901 A1* | 7/2007 | Caine | F01L 1/25 123/302 |
| 2007/0215106 A1* | 9/2007 | Petridis | F01L 1/25 123/347 |
| 2007/0233332 A1* | 10/2007 | Kawada | B60K 6/365 701/13 |
| 2007/0234985 A1* | 10/2007 | Kolnnanovsky | F01L 9/04 123/90.15 |
| 2007/0235005 A1* | 10/2007 | Lewis | F01L 9/04 123/322 |
| 2008/0035082 A1* | 2/2008 | Liu | F01L 1/267 123/90.12 |
| 2008/0135021 A1 | 6/2008 | Michelini et al. | |
| 2008/0156293 A1* | 7/2008 | Huang | F02D 41/0002 123/299 |
| 2009/0048764 A1 | 2/2009 | Fuwa | |
| 2009/0151673 A1* | 6/2009 | Choi | F01L 1/344 123/90.15 |
| 2009/0177371 A1 | 7/2009 | Reinke | |
| 2009/0204312 A1* | 8/2009 | Moriya | F01L 1/344 701/103 |
| 2009/0277407 A1* | 11/2009 | Ezaki | F01L 1/024 123/90.15 |
| 2010/0006065 A1* | 1/2010 | Tripathi | F02D 41/0087 123/350 |
| 2010/0050993 A1 | 3/2010 | Zhao et al. | |
| 2010/0100299 A1* | 4/2010 | Tripathi | F02D 41/0087 701/102 |
| 2011/0000459 A1 | 1/2011 | Elsäßer | |
| 2011/0030657 A1* | 2/2011 | Tripathi | F02D 17/02 123/481 |
| 2011/0073069 A1 | 3/2011 | Marriott et al. | |
| 2011/0139099 A1* | 6/2011 | Roe | F01L 1/267 123/90.1 |
| 2011/0146637 A1* | 6/2011 | Kang | F02D 21/08 123/568.19 |
| 2011/0208405 A1* | 8/2011 | Tripathi | F02D 17/02 701/102 |
| 2011/0213541 A1 | 9/2011 | Tripathi et al. | |
| 2011/0214640 A1 | 9/2011 | Chang et al. | |
| 2012/0031357 A1 | 2/2012 | Ervin et al. | |
| 2012/0042633 A1* | 2/2012 | Silvestri | F01N 3/208 60/274 |
| 2013/0006497 A1* | 1/2013 | Silvers | F02D 41/0087 701/103 |
| 2013/0008412 A1* | 1/2013 | Kidooka | F01L 1/34 123/481 |
| 2013/0066502 A1* | 3/2013 | Yuille | B60K 6/48 701/22 |
| 2013/0092128 A1 | 4/2013 | Pirjaberi et al. | |
| 2013/0118443 A1 | 5/2013 | Tripathi et al. | |
| 2013/0276730 A1* | 10/2013 | Borean | F02D 41/0087 123/90.11 |
| 2014/0041624 A1 | 2/2014 | Rayl et al. | |
| 2014/0041625 A1 | 2/2014 | Pirjaberi et al. | |
| 2014/0045652 A1 | 2/2014 | Carlson et al. | |
| 2014/0069381 A1* | 3/2014 | Beikmann | F02D 41/0087 123/406.12 |
| 2014/0109847 A1 | 4/2014 | Hayman et al. | |
| 2014/0158067 A1 | 6/2014 | Woo et al. | |
| 2014/0277999 A1 | 9/2014 | Switkes et al. | |
| 2014/0318485 A1* | 10/2014 | Stolk | F01L 13/0036 123/90.15 |
| 2014/0360477 A1 | 12/2014 | Doering et al. | |
| 2015/0233308 A1* | 8/2015 | Kidooka | F02D 13/06 701/104 |
| 2015/0308301 A1* | 10/2015 | McConville et al. | F01L 1/34 123/90.15 |
| 2015/0322869 A1* | 11/2015 | Shost | F02D 41/0085 123/481 |
| 2016/0003168 A1* | 1/2016 | Leone | F02D 17/02 123/406.47 |
| 2016/0003169 A1* | 1/2016 | Leone | F02D 41/0087 123/481 |
| 2016/0010568 A1 | 1/2016 | Whiston et al. | |
| 2016/0040614 A1 | 2/2016 | Younkins et al. | |
| 2016/0108798 A1* | 4/2016 | VanDerWege | F02D 41/0087 60/602 |
| 2016/0108828 A1* | 4/2016 | Glugla | F02D 41/0087 123/344 |
| 2016/0115878 A1* | 4/2016 | VanDerWege | F02D 41/0087 123/333 |
| 2016/0115884 A1* | 4/2016 | VanDerWege | F02D 41/0087 123/481 |
| 2016/0146120 A1* | 5/2016 | Kawaguchi | F01L 1/267 123/559.2 |
| 2016/0160701 A1 | 6/2016 | Choi et al. | |
| 2016/0222899 A1* | 8/2016 | Glugla | F02D 41/024 |
| 2016/0377007 A9 | 12/2016 | Wilcutts et al. | |
| 2017/0009729 A1 | 1/2017 | Younkins et al. | |

FOREIGN PATENT DOCUMENTS

| | | | | |
|---|---|---|---|---|
| IN | WO 2012112817 | * | 8/2012 | F01L 1/053 |
| IN | WO 2016036936 A1 | * | 3/2016 | F02D 41/0087 |
| JP | 2006242013 A | * | 9/2006 | |

OTHER PUBLICATIONS

Written Opinion dated Sep. 3, 2015 from International Application No. PCT/US 15/29543.
International Search Report dated Feb. 19, 2016 from International Application No. PCT/US2015/059776.
Written Opinion dated Feb. 19, 2016 from International Application No. PCT/US2015/059776.
Younkins et al., U.S. Appl. No. 14/919,018 filed Oct. 21, 2015.
Younkins et al., U.S. Appl. No. 15/274,029 filed Sep. 23, 2016.
Younkins et al., U.S. Appl. No. 15/485,000 filed Apr. 11, 2017.
Shost et al., U.S. Appl. No. 15/487,127, filed Apr. 13, 2017.
U.S. Office Action dated May 23, 2018 from U.S. Appl. No. 15/485,000.

* cited by examiner

| Level | FF | Sequence # | Bank Firing Pattern | Cylinder Firing Pattern |
|---|---|---|---|---|
| 1 | 0 | 1 | | |
| 2 | 1/9 | 1 | LR | F1, 8S, F4, 8S |
| 2 | 1/9 | 2 | RL | 1S, F2, 8S, F5, 7S |
| 2 | 1/9 | 3 | LR | 2S, F3, 8S, F6, 6S |
| 3 | 1/8 | 1 | LLL | F1, 7S, F3, 7S, F5, 7S |
| 3 | 1/8 | 2 | RRR | 1S, F2, 7S, F4, 7S, F6, 6S |
| 4 | 1/7 | 1 | LRLRLR | F1, 6S, F2, 6S, F3, 6S, F4, 6S, F5, 6S, F6, 6S |
| 5 | 1/6 | 1 | L | F1, 5S |
| 5 | 1/6 | 2 | R | 1S, F2, 4S |
| 5 | 1/6 | 3 | L | 2S, F3, 3S |
| 5 | 1/6 | 4 | R | 3S, F4, 2S |
| 5 | 1/6 | 5 | L | 4S, F5, 1S |
| 5 | 1/6 | 6 | R | 5S, F6 |
| 6 | 1/5 | 1 | LRLRLR | F1, 4S, F6, 4S, F5, 4S, F4, 4S, F3, 4S, F2, 4S |
| 7 | 2/9 | 1 | LLRR | F1, 3S, F5, 4S, F4, 3S, F2, 4S |
| 7 | 2/9 | 2 | RRLL | 1S, F2, 3S, F6, 4S, F5, 3S, F3, 3S |
| 7 | 2/9 | 3 | LLRR | 2S, F3, 3S, F1, 4S, F6, 3S, F4, 2S |
| 8 | 1/4 | 1 | LLL | F1, 3S, F5, 3S, F3, 3S |
| 8 | 1/4 | 2 | RRR | 1S, F2, 3S, F6, 3S, F4, 2S |
| 9 | 2/7 | 1 | LRRLLRRLLRRL | F1, 2S, F4, 3S, F2, 2S, F5, 3S, F3, 2S, F6, 3S, F4, 2S, F1, 3S, F5, 2S, F2, 3S, F6, 2S, F3, 3S |
| 10 | 1/3 | 1 | LR | F1, 2S, F4, 2S |
| 10 | 1/3 | 2 | RL | 1S, F2, 2S, F5, 1S |
| 10 | 1/3 | 3 | LR | 2S, F3, 2S, F6 |
| 11 | 3/8 | 1 | LLRLRLLR | F1, 1S, F3, 2S, F6, 2S, F3, 1S, F5, 2S, F2, 2S, F5, 1S, F1, 2S, F4, 2S |
| 11 | 3/8 | 2 | RRLRLRRL | 1S, F2, 1S, F4, 2S, F1, 2S, F4, 1S, F6, 2S, F3, 2S, F6, 1S, F2, 2S, F5, 1S |
| 12 | 2/5 | 1 | LLRRLLRRLLRR | F1, 1S, F3, 2S, F6, 1S, F2, 2S, F5, 1S, F1, 2S, F4, 1S, F6, 2S, F3, 1S, F5, 2S, F2, 1S, F4, 2S |
| 13 | 3/7 | 7 | LLLRRRLLLRRRLLLRRR | F1, 1S, F3, 1S, F5, 2S, F2, 1S, F4, 1S, F6, 2S, F3, 1S, F5, 1S, F1, 2S, F4, 1S, F6, 1S, F2, 2S, F5, 1S, F1, 1S, F3, 2S, F6, 1S, F2, 1S, F4, 2S |
| 14 | 4/9 | 1 | LLLLRRRR | F1, 1S, F3, 1S, F5, 1S, F1, 2S, F4, 1S, F6, 1S, F2, 1S, F4, 2S |
| 14 | 4/9 | 2 | RRRRLLLL | 1S, F2, 1S, F4, 1S, F6, 2S, F5, 1S, F1, 1S, F3, 1S, F5, 1S |
| 14 | 4/9 | 3 | LLLLRRRR | 2S, F3, 1S, F5, 1S, F1, 1S, F3, 2S, F6, 1S, F2, 1S, F4, 1S, F6 |
| 15 | 1/2 | 1 | LLL | F1, 1S, F3, 1S, F5, 1S |
| 15 | 1/2 | 2 | RRR | 1S, F2, 1S, F4, 1S, F6 |
| 16 | 5/9 | 1 | LRRRRLLLL | F1, F2, 1S, F4, 1S, F6, 1S, F2, 1S, F4, F5, 1S, F1, 1S, F3, 1S, F5, 1S |
| 16 | 5/9 | 2 | RLLLLRRRR | 1S, F2, 1S, F3, F5, 1S, F1, 1S, F3, 1S, F5, F6, 1S, F2, 1S, F4, 1S, F6 |
| 16 | 5/9 | 3 | LLRRRRLLLL | F1, 1S, F3, F4, 1S, F6, 1S, F2, 1S, F4, F6, F1, 1S, F3, 1S, F5, 1S |
| 17 | 4/7 | 1 | LRRRLLLLRRRLLLLRRRL LL | LRRRLLLLRRRLLLLRRRL F1, F2, 1S, F4, 1S, F6, 1S, F2, 1S, F4, F5, 1S, F1, 1S, F3, F4, F5, 1S, F1, 1S, F3, 1S, F5, F6, 1S, F2, 1S, F4, F5, 1S, F1, 1S, F3, 1S, F5, 1S |
| 18 | 3/5 | 1 | LRRRLLLRRRLLLRRRLL | F1, F2, 1S, F4, 1S, F6, F1, 1S, F3, 1S, F5, F6, 1S, F2, 1S, F4, F5, 1S, F1, 1S, F3, F4, F5, 1S, F1, 1S, F3, 1S, F5, 1S |
| 19 | 5/8 | 1 | LRRLLRRLLRRLL | F1, F2, 1S, F4, F5, 1S, F1, 1S, F3, F4, 1S, F6, 1S, F2, 1S, F3, 1S, F5, F6, 1S, F2, F3, 1S, F5, 1S |
| 19 | 5/8 | 2 | RLLRRLLRRRLLRR | 1S, F2, 1S, F3, F5, F6, 1S, F2, 1S, F4, F5, 1S, F1, F2, 1S, F4, 1S, F6, F1, 1S, F3, F4, 1S, F6 |
| 20 | 2/3 | 1 | LRRL | F1, F2, 1S, F4, F5, 1S |
| 20 | 2/3 | 2 | RLLR | 1S, F2, F3, 1S, F5, F6 |
| 20 | 2/3 | 3 | LLRR | F1, 1S, F3, F4, 1S, F6 |
| 21 | 5/7 | 1 | LRLLRRLRRLLRRLRRLLRRLRL LRRRL | F1, F2, F3, 1S, F5, F6, 1S, F2, F3, F4, 1S, F6, F1, 1S, F3, F4, F5, 1S, F1, F2, 1S, F4, F5, F6, 1S, F2, F3, 1S, F5, F6, F1, 1S, F3, F4, 1S, F6 |
| 22 | 3/4 | 1 | LRLLRLRL | F1, F2, F3, 1S, F5, F6, F1, 1S, F3, F4, F5, 1S |
| 22 | 3/4 | 2 | RLRRLRLR | 1S, F2, F3, F4, 1S, F6, F1, F2, 1S, F4, F5, F6 |
| 23 | 7/9 | 1 | LRLRLRRLRL | F1, F2, F3, F4, 1S, F6, F1, F2, F3, F4, F5, 1S |
| 23 | 7/9 | 2 | RLRLRLRLRR | 1S, F2, F3, F4, F5, F1, F2, F3, 1S, F5, F6, F1, F2, 1S, F4, F5, F6 |
| 23 | 7/9 | 3 | LLRLRLRRLR | F1, 1S, F3, F4, F5, F6, 1S, F2, F3, F4, 1S, F6, F1, F2, 1S, F5, F6 |
| 24 | 4/5 | 1 | LRLLRRLRRLRLRRLRRLLRRRLRRL RL | F1, F2, F3, F4, 1S, F6, F1, F2, F3, 1S, F5, F6, F1, F2, 1S, F4, F5, F6, F1, 1S, F3, F4, F5, F6, 1S, F2, F3, F4, F5, F6 |
| 25 | 5/6 | 1 | LRLRL | F1, F2, F3, F4, F5, 1S |
| 25 | 5/6 | 2 | RLRLR | 1S, F2, F3, F4, F5, F6 |
| 25 | 5/6 | 3 | LLRLR | F1, 1S, F3, F4, F5, F6 |
| 25 | 5/6 | 4 | LRRLR | F1, F2, 1S, F4, F5, F6 |
| 25 | 5/6 | 5 | LRLLR | F1, F2, F3, 1S, F5, F6 |
| 25 | 5/6 | 6 | LRLRR | F1, F2, F3, F4, 1S, F6 |
| 26 | 6/7 | 1 | LRLRLRRLRLLRLRLRRLRLRL | LRLRLRRLRLLRLRLRRLRL F1, F2, F3, F4, F5, F6, 1S, F2, F3, F4, F5, F6, F1, 1S, F3, F4, F5, F6, F1, F2, 1S, F4, F5, F6, F1, F2, F3, 1S, F5, F6, F1, F2, F3, F4, 1S |
| 27 | 7/8 | 1 | LRLRLRLRLLRLRLRLRLR | F1, F2, F3, F4, F5, F6, F1, F2, F3, F4, F5, F6, F1, 1S, F5, F6, F1, F2, F3, F4, F5, 1S |
| 27 | 7/8 | 2 | LRLRLRLRLRLRRLRLRLR | F1, F2, F3, F4, F5, F6, F1, F2, F3, F4, F5, F6, F1, F2, 1S, F4, F5, F6, F1, F2, F3, F4, F5, F6 |
| 28 | 8/9 | 1 | LRLRLRLRLRLRLRLR | F1, F2, F3, F4, F5, F6, F1, F2, F3, F4, F5, F6, F1, F2, F3, F4, F5, 1S |
| 28 | 8/9 | 2 | LRLRLRLRLLRLRLRLR | F1, F2, F3, F4, F5, F6, F1, F2, F3, 1S, F5, F6, F1, F2, F3, F4, F5, F6 |
| 28 | 8/9 | 3 | LLRLRLRRLRLRLRLR | F1, 1S, F3, F4, F5, F6, F1, F2, F3, F4, 1S, F6, F1, F2, F3, F4, F5, F6 |
| 29 | 1 | 1 | LRLRLR | F1, F2, F3, F4, F5, F6 |

*FIG. 5A*

| Firing fraction | Bank 1 (1=activate, 0=deactivate) | Bank 1 output | Bank 2 valve lift command | Bank 2 output | Engine output |
|---|---|---|---|---|---|
| 1 | 1 | 0.50 | 1 | 0.50 | 1.000 |
| 1 | 1 | 0.50 | 0.75 | 0.38 | 0.875 |
| 1 | 1 | 0.50 | 0.5 | 0.25 | 0.750 |
| 1 | 1 | 0.50 | 0.25 | 0.13 | 0.625 |
| 1 | 1 | 0.50 | 0 | 0.00 | 0.500 |
| 1/2 | 0 | 0 | 1 | 0.50 | 0.500 |
| 1/2 | 0 | 0 | 0.75 | 0.38 | 0.375 |
| 1/2 | 0 | 0 | 0.5 | 0.25 | 0.250 |
| 1/2 | 0 | 0 | 0.25 | 0.13 | 0.125 |

*FIG. 5B*

| Firing fraction | Bank 1 firing fraction | Bank 1 output | Bank 2 valve lift command | Bank 2 output | Engine output |
|---|---|---|---|---|---|
| 1 | 1 | 0.50 | 1 | 0.5 | 1.000 |
| 1 | 1 | 0.50 | 0.75 | 0.375 | 0.875 |
| 7/8 | 3/4 | 0.38 | 1 | 0.5 | 0.875 |
| 5/6 | 2/3 | 0.33 | 1 | 0.5 | 0.833 |
| 1 | 1 | 0.50 | 0.5 | 0.25 | 0.750 |
| 7/8 | 3/4 | 0.38 | 0.75 | 0.375 | 0.750 |
| 3/4 | 1/2 | 0.25 | 1 | 0.5 | 0.750 |
| 5/6 | 2/3 | 0.33 | 0.75 | 0.375 | 0.708 |
| 2/3 | 1/3 | 0.17 | 1 | 0.5 | 0.667 |
| 1 | 1 | 0.50 | 0.25 | 0.125 | 0.625 |
| 7/8 | 3/4 | 0.38 | 0.5 | 0.25 | 0.625 |
| 3/4 | 1/2 | 0.25 | 0.75 | 0.375 | 0.625 |
| 5/8 | 1/4 | 0.13 | 1 | 0.5 | 0.625 |
| 5/6 | 2/3 | 0.33 | 0.5 | 0.25 | 0.583 |
| 2/3 | 1/3 | 0.17 | 0.75 | 0.375 | 0.542 |
| 1 | 1 | 0.50 | 0 | 0 | 0.500 |
| 7/8 | 3/4 | 0.38 | 0.25 | 0.125 | 0.500 |
| 3/4 | 1/2 | 0.25 | 0.5 | 0.25 | 0.500 |
| 5/8 | 1/4 | 0.13 | 0.75 | 0.375 | 0.500 |
| 1/2 | 0 | 0.00 | 1 | 0.5 | 0.500 |
| 5/6 | 2/3 | 0.33 | 0.25 | 0.125 | 0.458 |
| 2/3 | 1/3 | 0.17 | 0.5 | 0.25 | 0.417 |
| 7/8 | 3/4 | 0.38 | 0 | 0 | 0.375 |
| 3/4 | 1/2 | 0.25 | 0.25 | 0.125 | 0.375 |
| 5/8 | 1/4 | 0.13 | 0.5 | 0.25 | 0.375 |
| 1/2 | 0 | 0.00 | 0.75 | 0.375 | 0.375 |
| 5/6 | 2/3 | 0.33 | 0 | 0 | 0.333 |
| 2/3 | 1/3 | 0.17 | 0.25 | 0.125 | 0.292 |
| 3/4 | 1/2 | 0.25 | 0 | 0 | 0.250 |
| 5/8 | 1/4 | 0.13 | 0.25 | 0.125 | 0.250 |
| 1/2 | 0 | 0.00 | 0.5 | 0.25 | 0.250 |
| 2/3 | 1/3 | 0.17 | 0 | 0 | 0.167 |
| 5/8 | 1/4 | 0.13 | 0 | 0 | 0.125 |
| 1/2 | 0 | 0.00 | 0.25 | 0.125 | 0.125 |

*FIG. 5C*

INTERNAL COMBUSTION ENGINE USING VARIABLE VALVE LIFT AND SKIP FIRE CONTROL

CROSS REFERENCE TO RELATED APPLICATIONS

This application claims the benefit of U.S. Provisional Patent Application Nos. 61/991,767, filed May 12, 2014 and entitled "INTERNAL COMBUSTION ENGINE USING VARIABLE VALVE LIFT AND SKIP FIRE CONTROL". The foregoing application is hereby incorporated herein by reference.

BACKGROUND

Field of the Described Embodiments

The described embodiments relate generally to internal combustion engines and to methods and arrangements for controlling internal combustion engines to operate more efficiently. More particularly, methods and arrangements for controlling internal combustion engines using variable valve lift and cylinder deactivation are described.

Description of the Related Art

The output of many internal combustion engines is controlled by adjusting the mass air charge (MAC) delivered to each fired cylinder. An engine control unit (ECU) directs delivery of the appropriate fuel charge for the commanded MAC. Gasoline fueled engines generally operate with an air/fuel ratio at or near stoichiometry to facilitate conversion of harmful pollutants to more benign compounds in a catalytic converter. Control of the MAC is most easily accomplished by adjusting the throttle position which in turn alters the intake manifold pressure (MAP). However, it should be appreciated that the MAC can be varied using other techniques as well. For example, variable intake valve lift control can be used to adjust the MAC. Adjusting the valve lift has the advantage of reducing pumping losses thereby increasing fuel efficiency, particularly at low or intermediate engine loads. A disadvantage of valve lift control is that the hardware needed to implement valve lift control tends to be relatively expensive and the control algorithms complex. Other techniques (e.g. altering the valve timing with a cam phaser) can also be used to adjust the MAC; however, use of a cam phaser has only a limited range of control over the MAC. There are a number of other engine parameters, including fuel charge, spark advance timing, etc. that may be used to alter the torque provided by each firing as well; however, use of these control parameters generally results in a lower fuel economy. If the controlled engine permits wide variations of the air-fuel ratio (e.g. as is permitted in most diesel engines), it is possible to vary the cylinder torque output by solely adjusting the fuel charge.

Over the years there have been a wide variety of efforts made to improve the fuel efficiency of internal combustion engines. One approach that has gained popularity is to vary the displacement of the engine. Most commercially available variable displacement engines effectively "shut down" or "deactivate" some of the cylinders during certain low-load operating conditions. When a cylinder is "deactivated", its piston typically still reciprocates; however, neither air nor fuel is delivered to the cylinder so the piston does not deliver any net power. Since the cylinders that are shut down do not deliver any power, the proportional load on the remaining cylinders is increased, thereby allowing the remaining cylinders to operate with improved fuel efficiency. Also, the reduction in pumping losses improves overall engine efficiency resulting in further improved fuel efficiency.

Another method of controlling internal combustion engines is skip fire control where selected combustion events are skipped during operation of an internal combustion engine so that other working cycles operate at better efficiency. In general, skip fire engine control contemplates selectively skipping the firing of certain cylinders during selected firing opportunities. Thus, for example, a particular cylinder may be fired during one firing opportunity and then may be skipped during the next firing opportunity and then selectively skipped or fired during the next. This is contrasted with conventional variable displacement engine operation in which a fixed set of the cylinders are deactivated during certain low-load operating conditions. With skip fire control, cylinders are also preferably deactivated during skipped working cycles in the sense that air is not pumped through the cylinder and no fuel is delivered and/or combusted during skipped working cycles when such valve deactivation mechanism is available. Often, no air is introduced to the deactivated cylinders during the skipped working cycles thereby reducing pumping losses. The Applicants have filed a number of patent applications generally directed at dynamic skip fire control. These include U.S. Pat. Nos. 7,849,835; 7,886,715; 7,954,474; 8,099,224; 8,131,445; 8,131,447; 8,336,521; 8,449,743; 8,511,281; 8,616,181; and pending U.S. patent application Ser. Nos. 13/309,460; 13/654,244; and 13/654,248.

With skip fire control, certain firing patterns and/or firing fractions have been shown to provide preferred noise, vibration, and harshness (NVH) characteristics. Thus it is common to limit skip fire operation to a set of available firing patterns or firing fractions that have preferred NVH characteristics. However, limiting skip fire operation to a limited set of available firing patterns/fractions while operating the engine in an optimal manner may result in providing a mismatch between the output torque and the requested input torque command. This problem may be solved by changing engine manifold pressure through incrementally closing/opening the throttle blade or adjusting the cam phaser. Although these methods can provide a matched torque output to input torque command, they come at the expense of increased pumping losses.

Although conventional skip fire control works well to increase fuel efficiency, there are continuing efforts to even further improve engine efficiency.

SUMMARY OF THE DESCRIBED EMBODIMENTS

According to an aspect, a method is described for operating an internal combustion engine having a plurality of cylinders. At least one cylinder is deactivated, and at least another cylinder is controlled using variable valve lift to control an amount of air intake in the cylinder.

According to another aspect, an internal combustion engine is described. The internal combustion engine includes a plurality of cylinders arranged in a bank. At least one cylinder is capable of valve deactivation and at least one cylinder is capable of variable valve lift control.

According to yet another aspect, an internal combustion engine is described. The internal combustion engine includes a first bank including a plurality of cylinders and a second bank including a plurality of cylinders. The cylinders of the first bank are controlled by skip fire control. Each cylinder on the second bank includes an intake valve with variable valve lift control.

BRIEF DESCRIPTION OF THE DRAWINGS

The embodiments will be readily understood by the following detailed description in conjunction with the accompanying drawings, wherein like reference numerals designate like structural elements, and in which:

FIG. 5A shows a range of exemplary skip fire levels and firing patterns for a V6 engine where the firing fraction is varied from ⅑ to 1.

FIG. 5B is a table showing engine output for a V6 engine operating with cylinder deactivation control on one bank and variable valve lift control on a second bank.

FIG. 5C is a table showing engine output for a V6 engine operating with one cylinder bank that uses skip fire control and another cylinder bank that is controlled using variable valve lift control.

Figure 1:
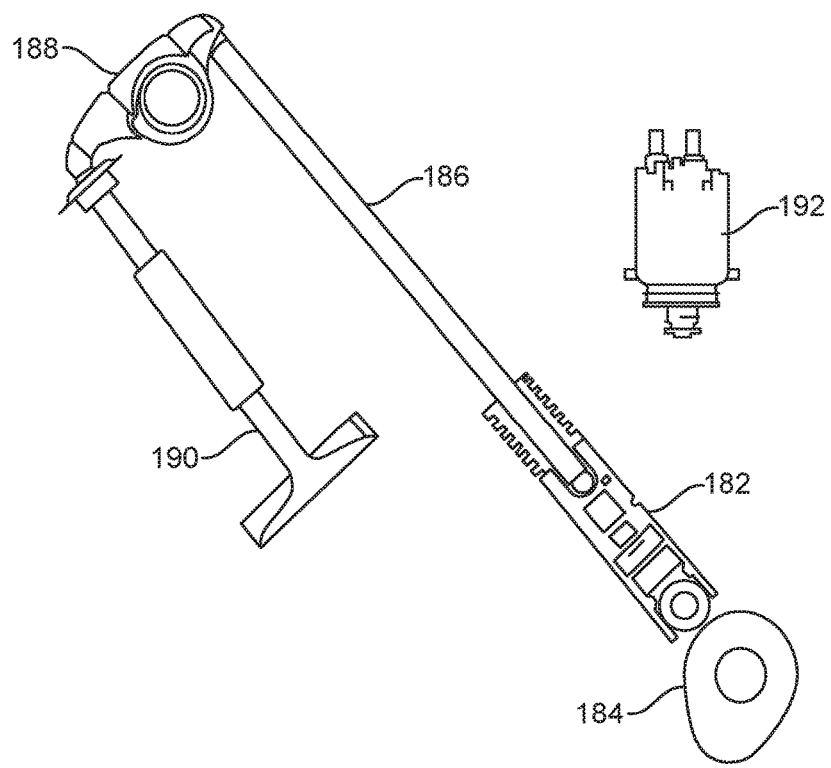
FIG. 1 shows an example of a mechanism used in cam and pushrod valve trains for cylinder deactivation.

It should also be appreciated that the depictions in the figures are diagrammatic and not to scale.

DESCRIBED EMBODIMENTS

In this patent application, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

As discussed above, variable displacement engines deactivate certain cylinders when they are not needed to increase fuel efficiency. Such cylinder deactivation reduces engine pumping losses. Similarly, under skip fire control, skipped cylinders may be deactivated during the skipped firing opportunity to help reduce pumping losses. However, in conventional variable displacement and skip fire control, a throttle is often still used to decrease manifold pressure to match the torque output to torque demand, which can result in some pumping losses (albeit significantly less losses than might be seen using all cylinder operation).

Another known approach for reducing pumping losses is to implement variable valve lift control. Variable valve lift allows precise control of the height and duration of the opening of a cylinder intake valve. Using variable valve lift, the intake valve can be regulated to control the amount of air or air/fuel mixture entering the cylinder. As variable valve lift allows for precise control of the lift of the intake valves, the cylinder mass air charge (MAC) can be controlled entirely by intake valves and there may be therefore no need for a throttle valve in some cases. Without the requirement for a throttle, the intake manifold may also be eliminated in some embodiments. In cases where valve lift control is present, use of a throttle may assist in some air transitions as well as for the purposes of generating vacuum for evaporative emissions (purge) control.

Additionally, when torque demand is relatively low, skip fire operation can result in relatively few, high magnitude, torque pulses associated with a cylinder firing. This can sometimes introduce undesirable NVH effects. This potential limitation of skip fire control can be ameliorated through the use of variable valve lift on some of the cylinders to regulate the MAC on selected cylinders. The present invention combines cylinder deactivation with variable valve lift to facilitate engine control in a cost effective, fuel efficient manner that can provide good NVH characteristics. It will be noted that the control, whether skip fire or variable valve lift, can be electronically controlled by the engine control unit (ECU) or some other controller.

Embodiments described herein include an internal combustion engine having a first set of cylinders that can be deactivated and a second set of cylinders that have variable valve lift control. In some embodiments these sets may be coextensive. In some embodiments, the deactivatable cylinders can be operated in a skip fire manner, while in others, they may be shut down individually or as a group for a longer period of time as may be done in conventional variable displacement operation. A combination of variable valve lift and skip fire/valve deactivation strategies enables operation at high intake manifold air pressure at intermediate engine output levels, which can result in improved fuel efficiency while providing desirable NVH characteristics. Skip fire control and variable valve lift control can work cooperatively to substantially minimize pumping loss and optimize cylinder charge to maximize engine fuel efficiency.

It will be noted that there are different methods for deactivating cylinders. For example, the valves may be controlled using an eccentric cam to open and close the valves. A collapsible valve lifter may be incorporated in the valve train to allow deactivation of the valves during a skipped firing cycle. The collapsible lifter is controlled using a solenoid, which in turn may be controlled by the ECU. The solenoid may allow introduction of a working fluid (such as motor oil) into the collapsible lifter to either force the lifter to remain in its fully extended (fixed state) position or allow the lifter to collapse (compressible state), leaving the valve in a closed position. An oil galley including a plurality of oil passageways may be used to deliver the pressurized oil from the solenoid to the collapsible lifter. In many cases the working fluid shifts the position of a locking pin in the collapsible lifter to shift the collapsible lifter between its fixed and compressible state. Pressurized oil applied to the pin allows compression of the collapsible lifter resulting in deactivation of the valve. That is the valve will remain closed as long as pressurized fluid is applied to the collapsible lifter associated with the valve.

FIG. 1 shows an example of a collapsible roller lifter 182 used in an exemplary cam-pushrod valve train. The collapsible roller lifter 182 may use hydraulic control of a lifter pin (not shown in FIG. 1) to cause the lifter 182 to be compressible in the deactivated state. The motion of the cam lobe 184 is thus not transferred to the push rod 186 and is "lost," as the lifter is collapsed. Since the push rod 186 does not transfer the cam lobe 184 motion, rocker arm 188 and engine valve 190 are stationary, resulting in the valve 190 remaining closed or deactivated. An oil control valve 192 may be used to control the hydraulic pressure applied to the lifter pin (not shown in FIG. 1). Although numerous mechanisms are possible for cylinder deactivation, mechanisms that provide for energy efficient deactivation modes are preferred. For skip fire operation, each cylinder that can be activated/deactivated needs a deactivating mechanism and control method. If a group of cylinders is deactivated/activated substantially simultaneously, such as all cylinders in a bank, then only a single control element needs to be used for the entire bank. This has the advantage of minimizing part cost and may reduce the complexity of the control loop.

As noted above, variable valve lift control may be used to control engine output and reduce pumping loss. Numerous variable valve lift mechanisms have been explored, but some efficient and durable mechanisms are those that employ three-bar-link type systems where an eccentric cam can be rotated to vary the effective rocker ratio. The resulting valve lift curves of these mechanisms have demonstrated production feasibility. Examples of such mechanisms developed by BMW and Nissan are shown in FIGS. 2A and 2B respectively.

Figure 2A:
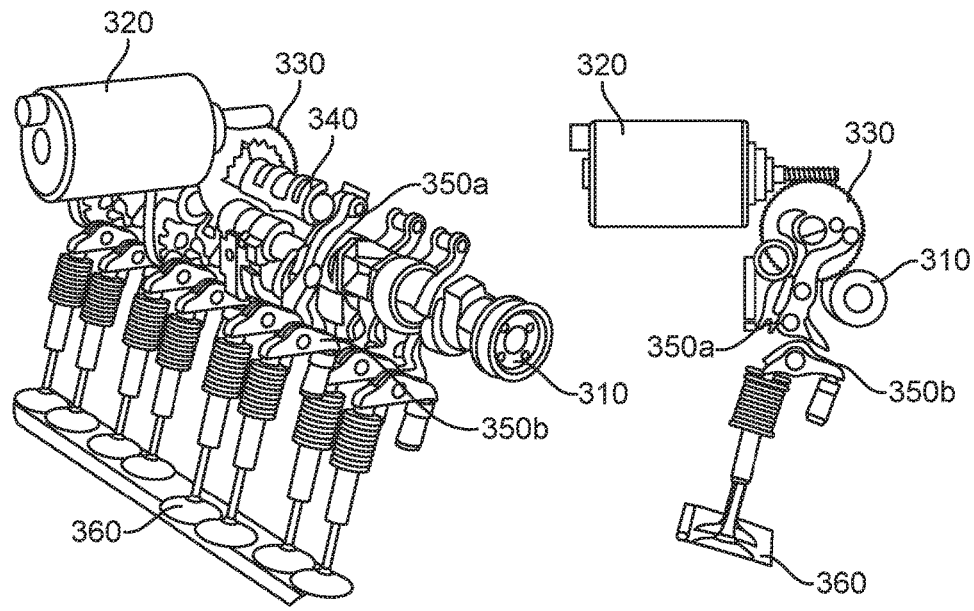
FIG. 2A illustrates an exemplary mechanism used for variable valve lift control.
Figure 2B:
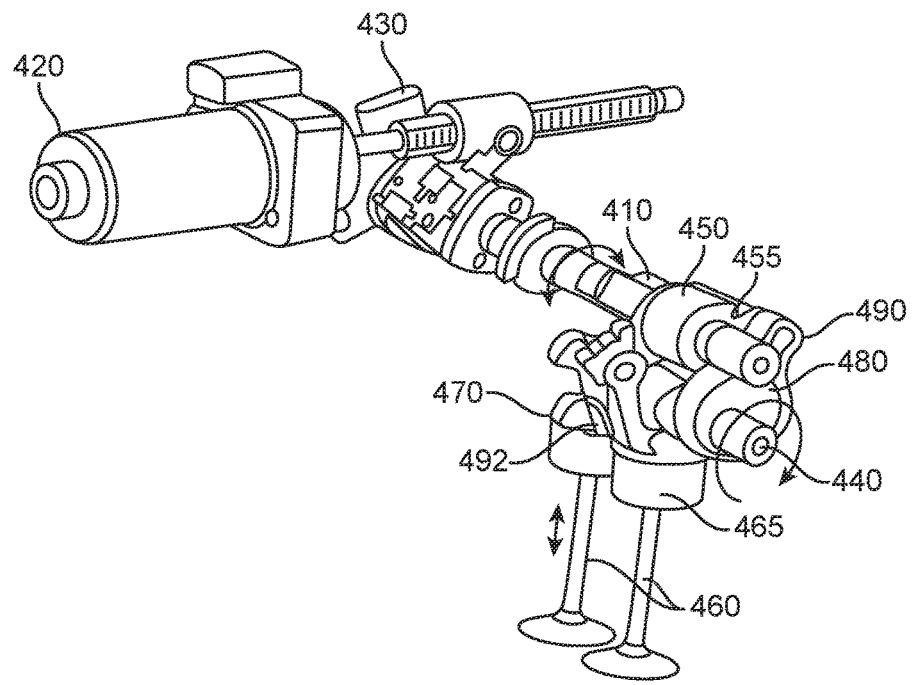
FIG. 2B illustrates another exemplary mechanism used for variable valve lift control.

The mechanisms for variable valve lift control shown in FIGS. 2A and 2B both include an electric motor for controlling the valve lift. FIG. 2A illustrates a mechanism with a perspective view on the left and a side view on the right. The mechanism shown in FIG. 2A employs a conventional inlet camshaft 310, and also uses the rotational output of an electric motor 320 to control the amount of valve lift. The electric motor 320 drives a gear 330, which is connected to an eccentric camshaft 340 and a set of intermediate rocker arms 350a, 350b that extend and retract to adjust the lift of the intake valves 360, as shown in FIG. 2A. The eccentric camshaft 340 causes movement of the intermediate rocker arms 350a, 350b. The intake camshaft 310 also acts on an intermediate rocker arm 350a through roller bearings. When more power is desired, the electric motor 320 turns the eccentric camshaft 340, which pushes on the intermediate rocker arms 350a, 350b, which in turn pushes the valves 360 to open more. The intermediate rocker arms 350a, 350b can pivot on a central point, by means of the eccentric camshaft 340, which is electronically actuated. The movement of the intermediate rocker arms 350a, 350b alone, without any movement of the intake camshaft 310, can adjust lift of the intake valves 360 from fully open (maximum power) to almost closed (idle). In some cases the amount of valve lift may be reduced to zero, such that the cylinder produces no torque and is effectively skipped. Thus, the MAC can be controlled solely by variable valve lift control, while maintaining the intake manifold pressure at or near the ambient atmospheric pressure.

The mechanism shown in FIG. 2B does not use a conventional intake camshaft. Each valve 460 and its corresponding valve lifter 465 are actuated by an oscillating output cam 470 which pivots on, but is not fixed to, a drive shaft 440. Conventional cam phasing typically uses rotation about a camshaft allowing different intake valve opening/closing relative to the piston position; however, in the mechanism shown in FIG. 2B, the cam 470 moves up and down, as shown by the arrows in FIG. 2B. The movement of the cam 470 is driven by the camshaft 440 via several connected components, including an eccentric input cam 480, link A 490, control cam 455, rocker arm 450, and link B 492. The mechanism in FIG. 2B adjusts valve lift using the control shaft 410 inside the rocker arm 450. By rotating the control shaft 410, the position of rocker arm 450 shifts, thereby changing the geometry of link A 490 and link B 492, and also the swing angle of the cam 470. The swing angle of the cam 470 determines the amount of valve lift. As shown in FIG. 2B, the mechanism employs an electric motor 420, which turns the control shaft 410. Also shown in FIG. 2B is a position sensor 430 on an end of the control shaft 410.

Figure 3A:
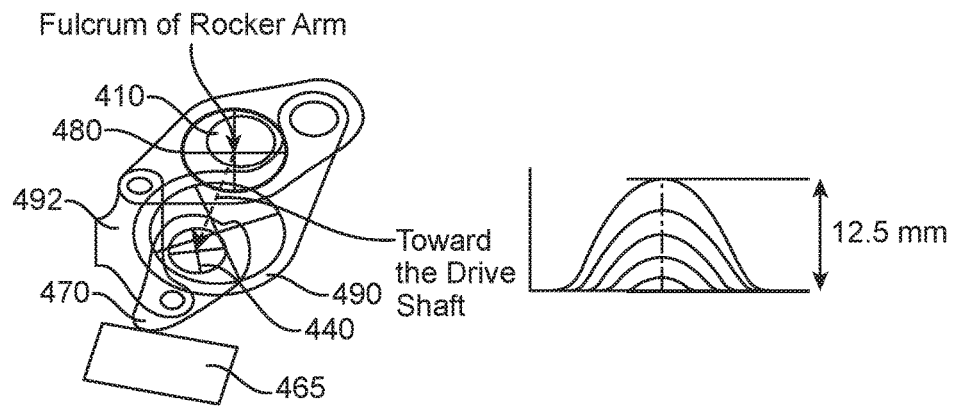
FIGS. 3A and 3B show exemplary valve lift curves for the mechanism shown in FIG. 2B.
Figure 3B:
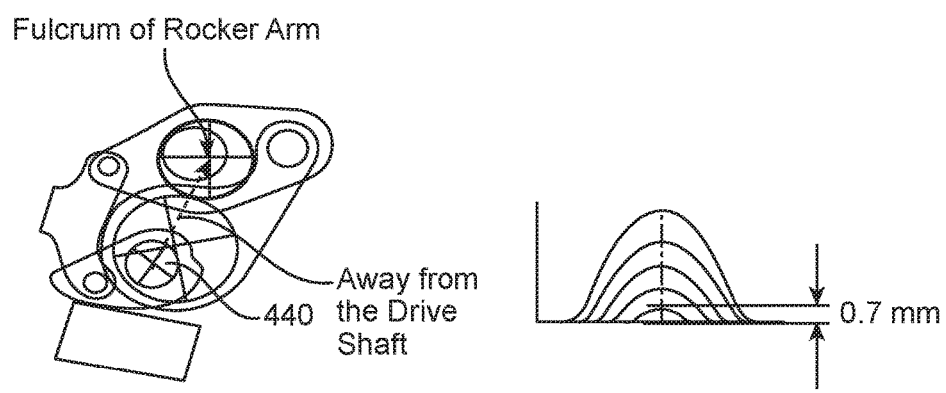

For the mechanism shown in FIG. 2B, as the eccentric input cam 480 is rotated, a family of valve lift curves can be produced from maximum lift (maximum power) to minimum lift (idle operation). FIGS. 3A and 3B shows exemplary valve lift curves for the mechanism shown in FIG. 2B and uses the same numeric designators for the various valve train components. In FIG. 3A, the variable valve adjustment mechanism is configured so that the valve opens to its fullest extended position, which is 12.5 mm in this example. In FIG. 3B, the variable valve adjustment mechanism is configured so that the valve opens as little as possible, 0.7 mm in this example. Intermediate valve lift heights are depicted by the family of valve lift curves shown in FIGS. 3A and 3B. Valve lift curves can be used to optimize cam design. Given the construction of this mechanism, a single fast actuator can be used on a shaft covering all cylinders arranged inline. Application of variable valve lift control to an inline 3, 4 or 6 cylinder engine or a single bank of a V6 or V8 engine is more economical than applications where multiple bank control is required, since only a single mechanism is required.

In addition to variable valve lift and cylinder deactivation, a cam phaser may also be used to control the timing of the opening and closing of a valve relative to crankshaft rotation. The cam phaser works by adjusting the phase relationship between the crankshaft and camshaft. Thus, for engines with cam operated valves all intake valves in a bank can be adjusted simultaneously by the cam phaser. Most modern vehicles dynamically adjust the cam phase angle to optimize engine performance over the variety of operating conditions experienced in everyday driving. It should be appreciated that variable valve lift, cam phase adjustment, and valve deactivation can all be implemented with mechanical systems that are essentially independent of each other. Thus, any line of cylinders may use none of these control systems or any combination of these control systems. Cylinder deactivation may be controlled as a group, for example, all cylinders in a bank, or may be controlled on an individual cylinder basis, using skip fire control.

Figure 4A:
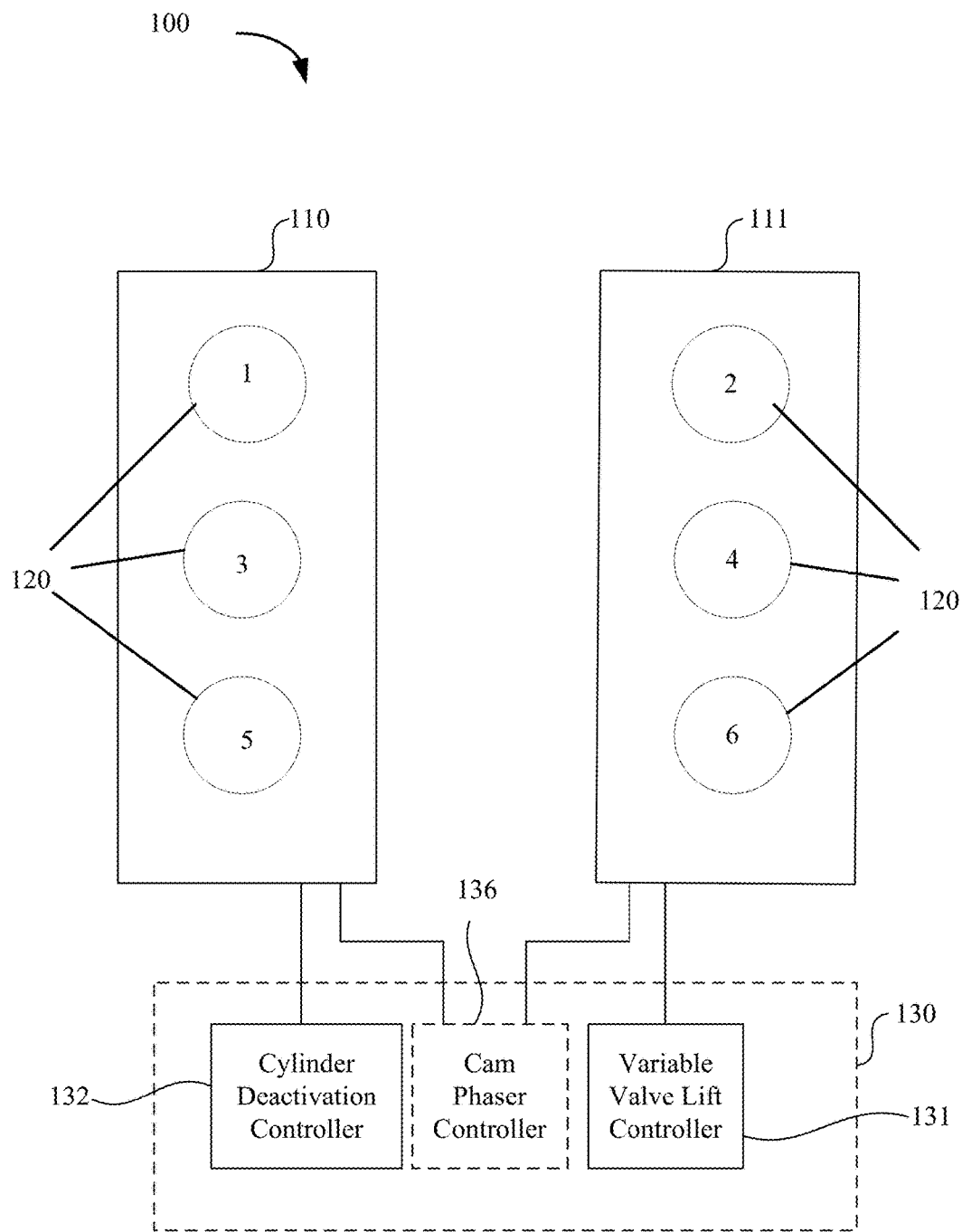
FIG. 4A is a schematic of a system for controlling an exemplary V6 engine in accordance with an embodiment where a single bank of cylinders may be deactivated.

According to an embodiment, an internal combustion engine implements valve deactivation in combination with variable valve lift control. The engine has a V configuration with two banks of cylinders. FIG. 4A is a schematic of a system for controlling an exemplary V6 engine 100 according to an embodiment. In the embodiment shown in FIG. 1A, an internal combustion engine 100 has a V6 configuration with two cylinder banks, a first cylinder bank 110 and a second cylinder bank 111. Each cylinder bank has three cylinders 120. The two cylinder banks 110 and 111 are controlled by the engine control unit 130. The engine control unit may include a variable valve lift controller 131 and a cylinder deactivation controller 132. The two cylinder banks 110 and 111 of engine 100 can thus be separately controlled. In the embodiment shown in FIG. 4A, the first bank of cylinders 110 may have only cylinder deactivation capability and the second bank of cylinders 111 may have only variable valve lift control. Thus, according to this embodiment, the first bank 110 can be deactivated (or activated if needed) using the cylinder deactivation controller 132, while the second bank 111 can be controlled using variable valve lift controller 131 to deliver the required or desired amount of engine output. Both the first bank 110 and/or the second bank 111 may optionally be equipped with a cam phaser controlled by a cam phaser controller 136 to control the intake valve timing. It has been shown that, for a V6 engine, deactivation of one cylinder bank can allow engine operation with acceptable NVH characteristics.

According to an embodiment, the engine control unit 130 activates/deactivates the cylinders 120 on the first bank 110. The lifter associated with cylinders 1, 3 and 5 on the first bank 110 are controlled so as be in their compressible state, which causes the valves on these cylinders to remain closed. The result is operation of the V-6 engine 100 as an inline 3 cylinder engine since the first engine bank 110 is deactivated.

The activated cylinders on the other bank 111 can be controlled to deliver the requested torque. As discussed above, variable valve lift control can be used to control the cylinder charge and the engine output. Advantageously the manifold intake pressure may be maintained at or near the ambient atmospheric pressure to reduce pumping loss and increase efficiency. Only the activated bank of cylinders 111 needs to be capable of variable valve lift control as the other bank 110 is deactivated. In the illustrated embodiment, the engine bank 110 containing cylinders 1, 3, 5 are deactivatable and cylinders 2, 4, 6 on engine bank 111 support variable valve lift control. However, it will be understood that, in another embodiment, the cylinder banks can be reversed with cylinders 2, 4, 6 of bank 111 being deactivatable and cylinders 1, 3, 5, of bank 110 supporting variable valve lift control.

Figure 4B:
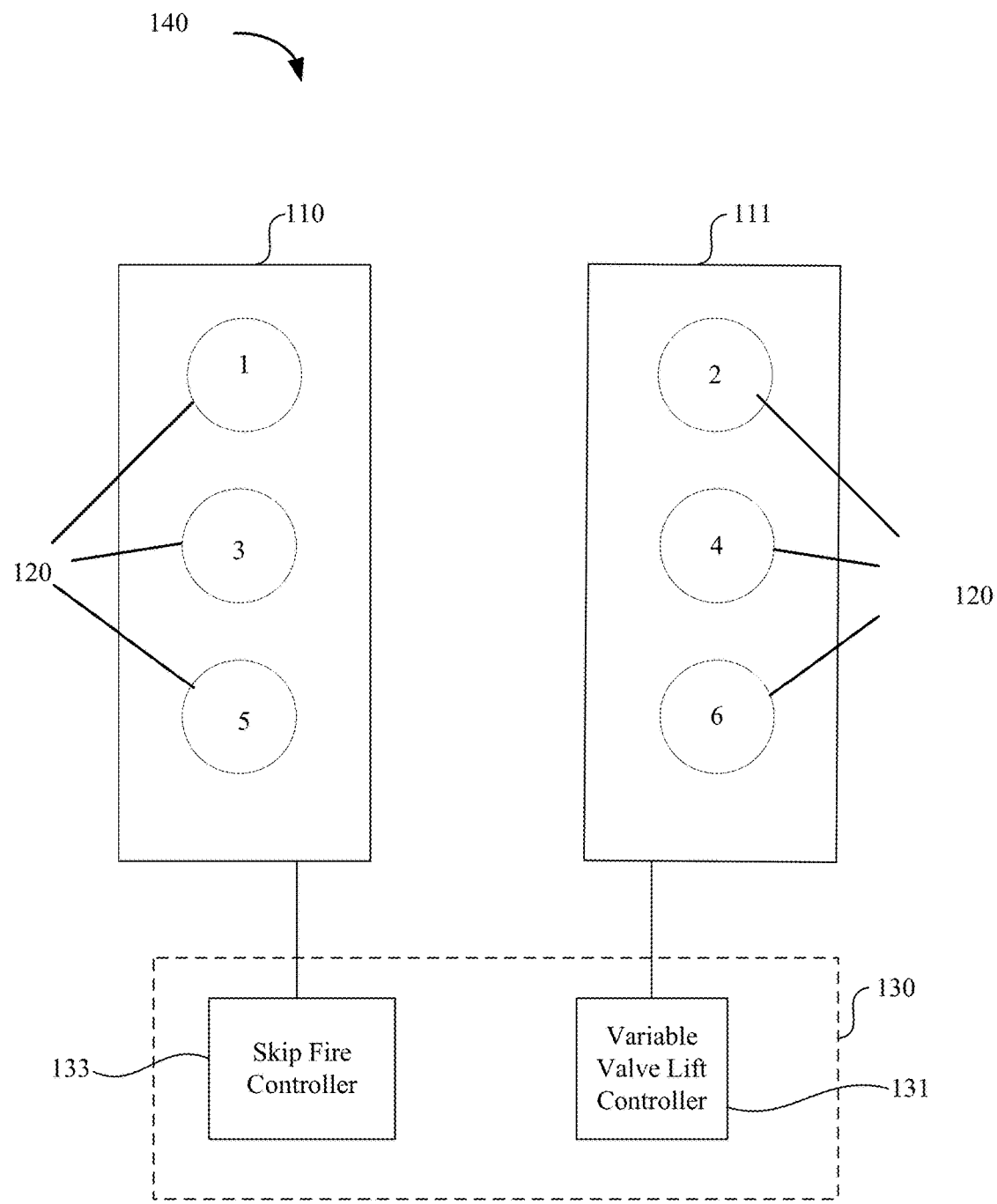
FIG. 4B is a schematic of a system for controlling an exemplary V6 engine in accordance with an embodiment where a single bank of cylinders operates with skip fire control.

FIG. 4B shows an embodiment where a V6 engine 140 uses a skip fire controller 133 to control a first bank of cylinders 110. The skip fire controller allows the selective firing or skipping of at least one cylinder on the first bank of cylinders 110. In some cases all the cylinders on the cylinder first bank 110 may be controlled in a skip fire manner. The second cylinder bank 111 is controlled by a variable valve lift controller 131. Both the variable valve lift controller 131 and the skip fire controller 133 may be situated in the ECU 130. Both the first bank 110 and/or the second bank 111 may optionally be equipped with a cam phaser to control the intake valve timing (not shown in FIG. 4B). Any mechanical or electro-mechanical system may be used to deactivate the valves on bank 110 and provide variable lift for the valves on bank 111.

An advantage of the engine design shown in FIGS. 4A and 4B is that it reduces the cost for the control assemblies, since both cylinder deactivation and variable valve control do not have to be implemented on all cylinders. Each bank has different methods of control and control strategies, but the banks work in concert to deliver the requested engine output.

Figure 4C:
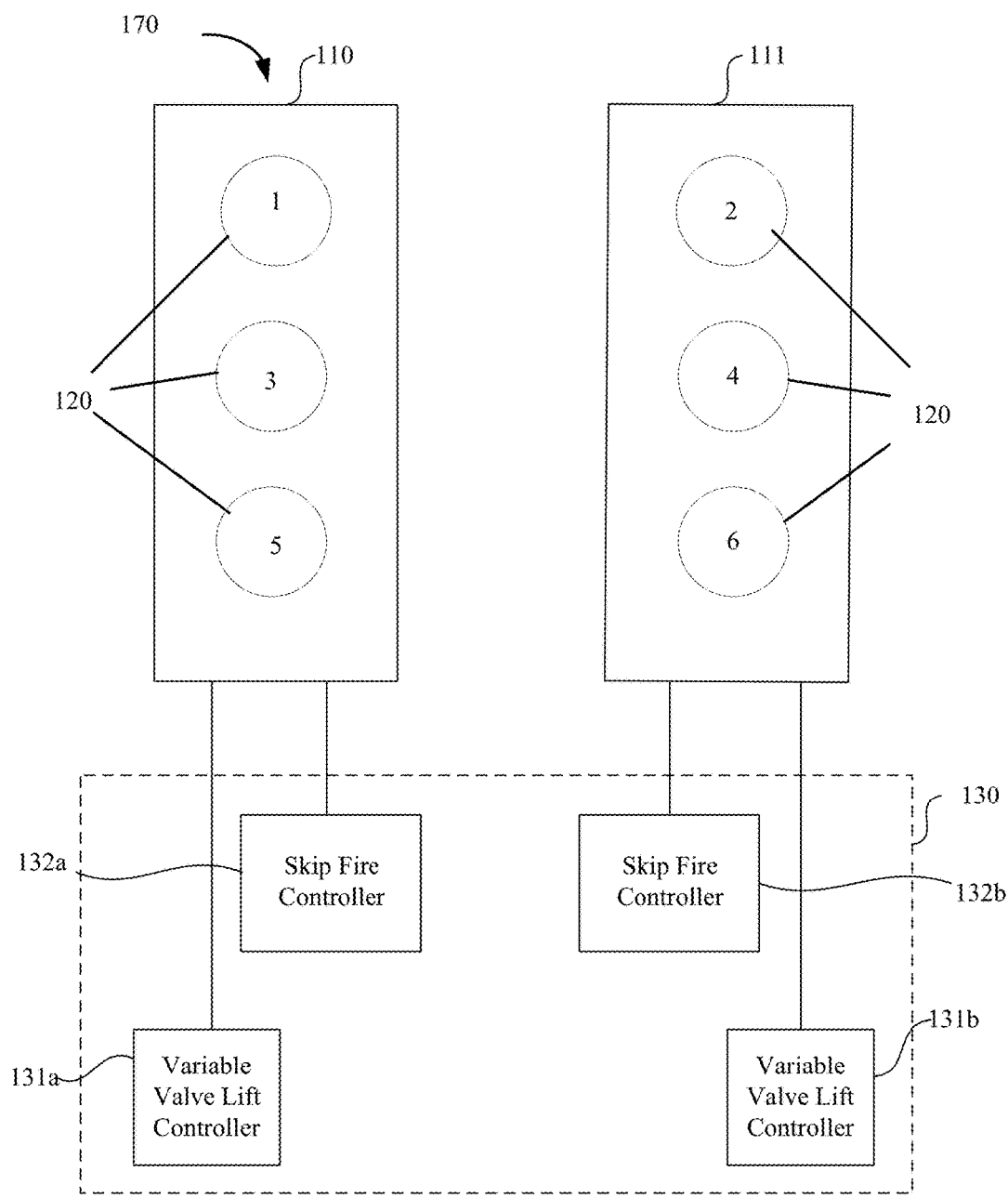
FIG. 4C is a schematic of a system for controlling an exemplary V6 engine in accordance with an embodiment where both cylinder banks operate with both variable valve lift and skip fire control.

In yet another approach, the V6 engine 170 has all cylinders capable of both deactivation and variable valve control. A variable valve lift controller 131*a* and a skip fire controller 133*a* control cylinder bank 110. A variable valve lift controller 131*b* and a skip fire controller 133*b* control cylinder bank 111. Both the variable valve lift controllers 131*a* and 131*b* and skip fire controllers 133*a* and 133*b* may be situated in the ECU 130. Both the first bank 110 and/or the second bank 111 may optionally be equipped with a cam phaser to control the intake valve timing (not shown in FIG. 4C). In should be appreciated that in some embodiments a cylinder deactivation controller may be substituted for one or both of the skip fire controllers 133*a* and 133*b*. The cylinder deactivation controller will allow all cylinders in a bank to be deactivated essentially simultaneously.

Figure 4D:
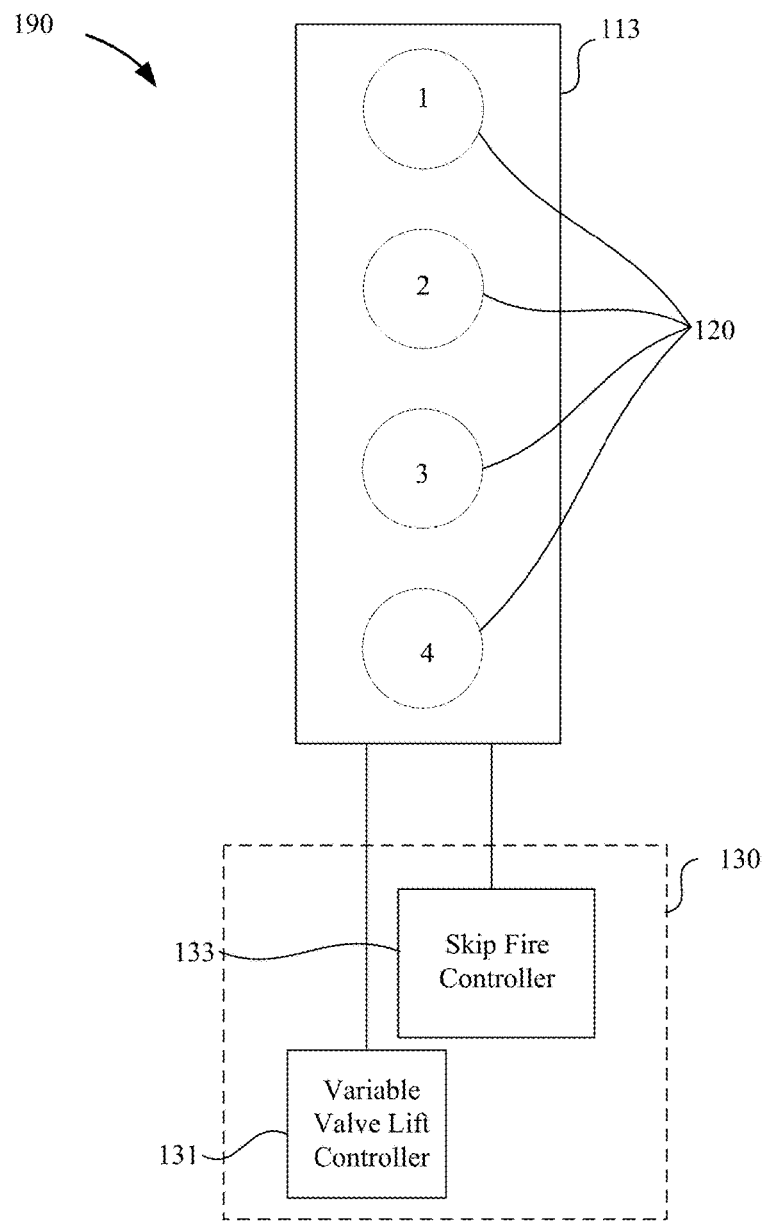
FIG. 4D is a schematic of a system for controlling an in-line, 4 cylinder engine in accordance with an embodiment where a cylinder bank operates with both variable valve lift and skip fire control.

FIG. 4D shows an embodiment for an inline 4 cylinder engine 190. The skip fire controller 133 allows the selective firing or skipping of at least one cylinder on the single cylinder bank 113. In some cases all the cylinders on the cylinder bank 113 may be controlled in a skip fire manner. Both the variable valve lift controller 131 and the skip fire controller 133 may be situated in the ECU 130. The cylinder bank 113 may optionally be equipped with a cam phaser to control the intake valve timing (not shown in FIG. 4D). Any mechanical or electro-mechanical system may be used to deactivate the valves and provide valve variable lift. It should be appreciated that use of a 4 cylinder inline engine is exemplary only and that the invention may be applied to inline engines having any number of cylinders in a single bank, such as 2, 3, 5, and 6 cylinder inline engines.

In another embodiment, the intake valves of all of the cylinders 120 on both cylinder banks 110 and 111 of the engine 100 are regulated by variable valve lift control capable of zero valve lift. It will be appreciated that a cylinder with an intake and/or intake and exhaust valve at zero lift is effectively deactivated. In this embodiment, one of the cylinder banks can be deactivated by setting the valve lift for those cylinders to zero and the other cylinder bank is controlled using variable valve lift control so that the delivered engine output matches the requested engine output.

A range of exemplary skip fire levels for an exemplary V6 engine is shown in table 500, FIG. 5A, where the firing fraction is varied from 0 to 1 using all denominators having values less than or equal to 9. Table 500 shows there are 29 distinct firing fractions. Table 500 is constructed so that all the firing patterns correspond to patterns with a most equal spacing between firing. That is, within any given pattern, the spacing between successive firings can differ by no more than one skip. These types of pattern have generally been found to yield better NVH characteristics compared to firing patterns with more uneven firing distributions. It should be appreciated however that there may be circumstances where operation with patterns having a non-uniform firing distribution yield acceptable NVH characteristics.

Some of these firing fractions have multiple distinct patterns. For example, at a firing fraction (FF) of one half (FF=½), the engine can operate in two different sequences 501 and 502. For a firing fraction of ⅙, the engine can operate in six different sequences, 503, 504, 505, 506, 507, and 508. In sequence 501 the engine will be firing cylinders 1, 3, and 5. In sequence 502 the engine will be firing cylinders 2, 4, and 6. In sequence 501 only the left bank is firing (denoted by LLL) 510 and in sequence 502 only the right bank is firing (denoted by RRR) 512. Similarly, for each sequence 503-508 the engine will be operating on only a single bank. Under skip fire control operating at FF=½, the engine effectively has one cylinder bank deactivated and one bank activated. The activated bank can be regulated using variable valve lift control, as discussed above. The deactivated bank can be deactivated by either a cylinder deactivation controller or a skip fire controller depending on the engine design.

For an embodiment with the V6 engine operated under skip fire control and with one cylinder bank subject to variable valve lift control, various control options are available. For example, in order to achieve a lower torque level, either the firing fraction, valve lift, or some combination of both may be reduced. For example, consider a 6 cylinder engine with a requested torque output of 1/6 the maximum engine output. To achieve this output a FF=1/6 can be commanded, where the fired cylinder receives its maximum cylinder charge. This same level of output torque can also be achieved using variable valve lift control by running a FF=1/2, yielding three cylinder firings with the valve lift area commanded to 1/3 of the full mass air charge (MAC). Obviously, the firing cylinders can be charged at an intermediate level between these values. This strategy may provide benefits in vibration and acoustic performance since each cylinder firing produces less of a torque impulse when the charge is smaller. Substantially the same output torque can be provided by operating all cylinders (FF=1) with variable valve lift such that the per cylinder MAC or cylinder charge is 1/6. Using this type of combined control allows operation at both a favorable firing fraction from an NVH perspective and a favorable cylinder load from a thermodynamic efficiency perspective. Since the cylinder load is controlled by use of variable lift valves the intake manifold pressure may remain at or near ambient atmospheric pressure, minimizing pumping losses. This strategy could be extended to provide any desired level of engine output. The per cylinder load or MAC may be chosen such that each firing cylinder operates at or near its maximum thermodynamic efficiency. This control strategy will maximize fuel economy, since it minimizes or eliminates pumping losses and operates each firing at its maximum efficiency.

Adaptive valve lift may be used to compensate for suboptimal manifold and/or purge vapor distributions inside the manifold. Valve lift differences per bank may include an adaptive correction, which may force different banks to different valve lifts, in order to assure best air or air/fuel vapor mixture distribution corrections. In practice, this changes the target control point of one bank's valve lift to account for differences in flow from one bank vs. the other. It may also account for mal-distributions in purge vapor entering the intake manifold, where the geometry and air entrainment of entering fuel vapor may favor one bank over the other. Adaptive targets for the valve lift may help compensate to provide more equal distribution between banks of cylinders.

Consider an engine as shown in FIG. 4A operating with its intake manifold at or near atmospheric pressure. In this case each cylinder may intake a maximum MAC with the appropriate valve settings. If all cylinders are fired (for example, by commanding the first bank to be fired), FIG. 5B shows that the output from the first cylinder bank (cylinders 1, 3, 5) produces 0.5 of the maximum engine output. The command valve lift for the second cylinder bank (cylinders 2, 4, 6) can be reduced incrementally from one (full engine output) to zero, resulting in engine output reducing from maximum to one half of its maximum value. To operate below an engine output of 1/2, the first bank of cylinders can be deactivated, resulting in a firing fraction of 1/2, and the second bank can be operated with 100% valve lift command. To reduce from an engine output of one half to zero, the valve lift command for the second bank is reduced to the desired level so that the requested engine output is delivered.

This type of control may be refined by adjusting the intake manifold pressure (MAP) and/or controlling an optional cam phaser on the first bank having cylinder deactivation. In this case the first bank no longer needs to operate with a full cylinder charge. For example, it may be possible to reduce the MAC on the first bank by up to approximately 40% using only a cam phaser and maintaining the MAP at or near atmospheric pressure. If the MAP is reduced, for example, by using a throttle, the second bank will also no longer be able to operate at full cylinder charge. A throttle and/or use of a cam phaser can be incorporated into an engine control algorithm in addition to cylinder deactivation on bank 1 and variable valve control on bank 2. While partially closing the throttle will engender some pumping losses, these losses can be minimized by only closing the throttle a small amount. The throttle may be closed so that the MAP is less than 20 kPa, 10 kPa, 5 kPa, or 2 kPa below the ambient atmospheric pressure. Alternatively, the MAP may be maintained at some substantially fixed pressure near the ambient atmosphere, such as 95 kPa, 90 kPa, 85 kPa, 80 kPa, or 75 kPa. The choice of the MAP may depend on the ambient atmospheric pressure. For example, at high elevations the ambient atmospheric pressure may be below 90 kPa, in which case a lower MAP target value may be used as the control set-point.

In another embodiment, an internal combustion engine has one bank of cylinders controlled by skip fire control and another bank of cylinders separately controlled using variable valve lift control as shown in FIG. 4B. In this embodiment, the two cylinder banks can be individually controlled to deliver the required amount of torque. As shown in the table of FIG. 5C, adjusting and combining skip fire control on the cylinders 120 of one bank 110 and variable valve lift control on the cylinders 120 of the other bank 111 can result in varying amounts of total engine output to produce the required output torque. The bank 110 firing fraction can vary between 0 and 1, while the bank 111 firing fraction is fixed at 1 (only variable valve lift control). This table assumes that the MAP is at or near atmospheric pressure and that the cam phaser on deactivatable cylinders (bank 1) is adjusted to maximize cylinder charge. Inspection of FIG. 5C reveals that the same engine output can be achieved with a wide variety of different contributions from the first cylinder bank and second cylinder bank. The combination which provides the maximum fuel efficiency, consistent with producing an acceptable NVH level may be used for engine operation. In some cases this will correspond to situations where a maximum cylinder charge is not used on bank 110. The cylinder charge may be reduced by using a cam phaser or reducing the intake manifold pressure. It will be understood that, for simplicity, the tables shown herein provide only certain firing fractions for skip fire control and only certain valve lifts for variable valve lift control. In practice, the valve lift can be controlled incrementally, so that the engine can produce a smoothly varying torque output.

In an embodiment, for example, the inline 4 cylinder engine shown in FIG. 4D, variable valve lift control may be applied in conjunction with skip fire control. This combination allows the engine output to vary smoothly across its entire operating range by adjusting the valve lift in combination with the firing fraction. A smooth change in the engine output can be obtained by decreasing the valve lift substantially simultaneously with increasing the firing fraction. Likewise, a smooth change in the engine output can be obtained by increasing the valve lift substantially simultaneously with decreasing the firing fraction. The degree of valve lift and firing fraction can be controlled to operate the engine with maximum fuel efficiency. For example, if a desired firing fraction yields a slightly unacceptable NVH level, the next higher firing fraction may be commanded and the MAC is matched by reduction of the valve lift. This achieves the torque output goal, without the fuel economy penalty associated with throttling the engine.

Although some of the embodiments herein are described with reference to a V6 engine, it will be understood that the deactivation, skip fire, and variable valve lift combinations can be applied to other engines having different configurations and cylinder counts. It should be appreciated that any firing command subset can be used independent of any cylinder count in an engine. Such structure can be defined based on the methodologies described herein at the desire/convenience of the control structure. As discussed above, skip fire control or valve deactivation can be implemented in conjunction with variable valve lift control to increase efficiency by reducing pumping losses.

In an embodiment, an engine can have both variable valve lift and valve deactivation technology. An engine with variable valve lift control and valve deactivation capability provides for an engine that can be operated at an intermediate torque level, which allows the firing fraction or firing density to be at a higher desired level for NVH while still maintaining high intake manifold pressure by utilizing variable valve lift on the firing cylinders to match the cylinder charge to the requested torque level. According to an embodiment, an internal combustion engine is provided with at least one cylinder capable of variable valve lift control and at least one cylinder capable of valve deactivation or skip fire control. It will be noted that a shorter or lower valve lift can have the same effect as operating fewer cylinders.

In the embodiments described herein, the throttle may be eliminated in some cases. As noted above, in some embodiments, the intake charge can be controlled entirely by the intake valves with variable valve lift and there is no need for a throttle valve to control the intake manifold pressure. As discussed above, although the throttle valve can be used to reduce engine intake manifold pressure to match torque output to input torque command, pumping losses are increased. Thus, the use of the throttle valve to control intake is not generally as desirable as using variable valve lift control.

Figure 6:
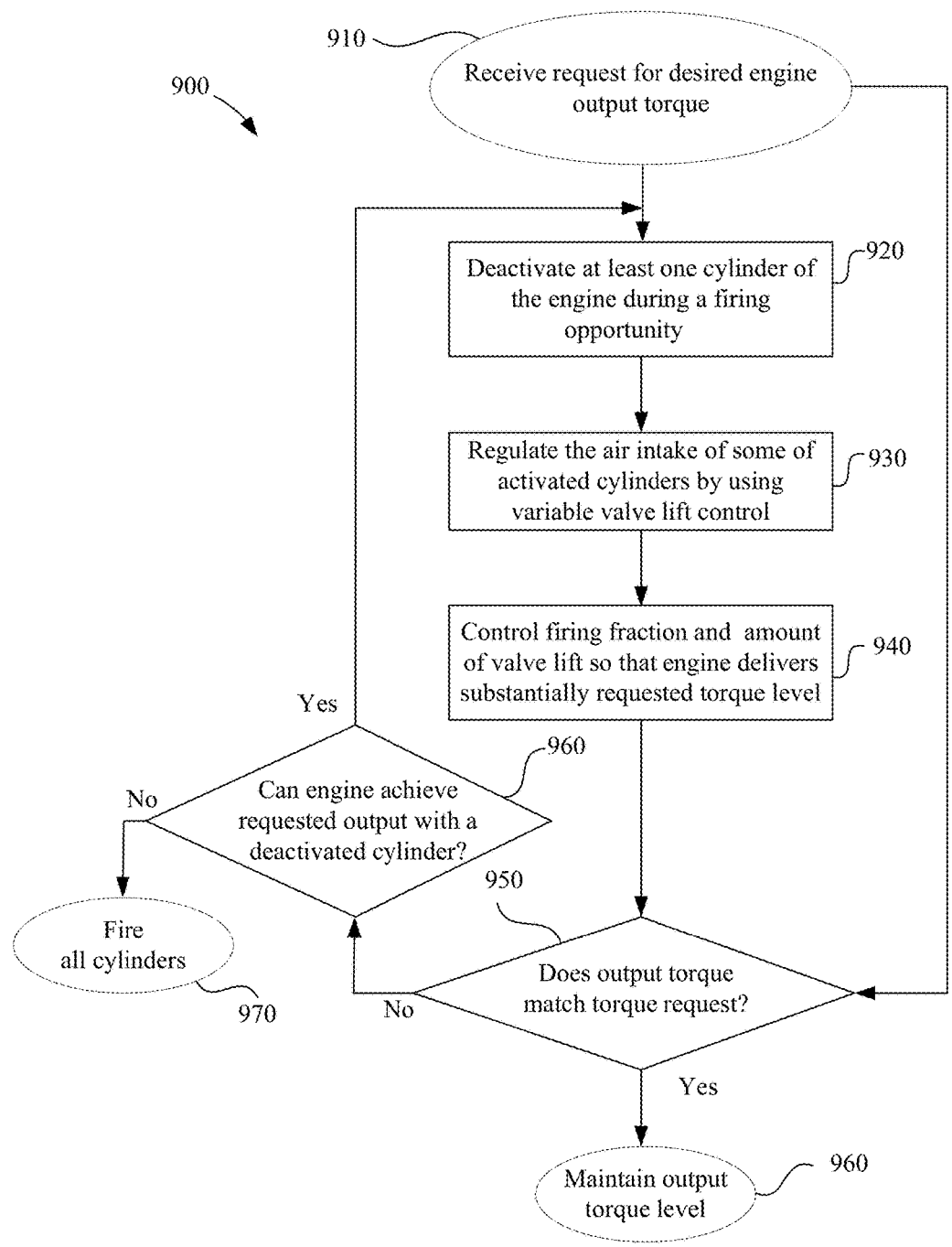
FIG. 6 is a flow diagram of a method of controlling an internal combustion engine using a combination of skip fire and variable valve lift control.

FIG. 6 is a flow diagram of a method 900 of controlling an internal combustion engine using a combination of skip fire and variable valve lift control. In 910, an internal combustion engine capable of skip fire and variable valve lift control receives a request to output a requested torque level. The torque request may be at least partially derived from the position of an accelerated pedal controlled by a vehicle driver. In 920, a skip fire controller selects a firing fraction less than one such that at least one cylinder of the internal combustion is deactivated during a firing opportunity. In 930, a variable valve lift controller is used to regulate the air intake for at least one activated cylinder of the engine. In 940, the firing fraction and valve lift are controlled so that the engine substantially delivers the requested output torque. In 950, the delivered output is compared against the requested torque. If the two values are substantially the same, method 900 proceeds to step 960 where the current output torque is maintained. If the two values are substantially different, the method proceeds to step 960. In 960, a determination is made whether the requested torque can be delivered with a firing fraction less than one, i.e. a deactivated cylinder. If a firing fraction of one is required to deliver the requested torque the method moves to step 970 where all cylinders are fired. If the requested torque can be delivered with a firing fraction less than 1, the method proceeds back to step 920. The firing fraction and valve lift are then adjusted so that the engine output torque substantially matches the requested torque as previously described.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings. For example, at step 950 additional criteria may be used in deciding whether to remain operating with the same firing fraction. Such criteria may include operation with an acceptable NVH level.

The method described in FIG. 6 can be repeated regularly during engine operation. For example, the method could be implemented at every firing opportunity, every second firing opportunity, every engine cycle, or some other interval that allows responsive engine operation. The firing fraction and degree of valve lift are thus regularly updated so that the engine output substantially matches the driver requested output.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

While the embodiments have been described in terms of particular embodiments, there are alterations, permutations, and equivalents, which fall within the scope of these general concepts. It should also be noted that there are alternative ways of implementing the methods and apparatuses of the present embodiments. It is therefore intended that the following appended claims be interpreted as including all such alterations, permutations, and equivalents as fall within the true spirit and scope of the described embodiments.

What is claimed is:

1. A method of operating an internal combustion engine having at least one camshaft and a plurality of cylinders, each cylinder having at least one associated cam actuated intake valve, the method comprising:
   directing skip fire operation of the engine in accordance with a firing fraction that defines a first effective displacement of the engine, wherein during skip fire operation of the engine, for at least one of the cylinders, the cylinder is deactivated during selected skipped cylinder working cycles such that air is not pumped through the cylinder during the skipped cylinder working cycles and selected active cylinder working cycles are fueled and fired, the skipped and active working cycles being interspersed such that the one cylinder is fired, skipped and selectively either fired or skipped during successive work cycles in accordance with the firing fraction, while the engine is operating at the first effective displacement; and
   controlling valve lift differently between the cam actuated intake valves associated with at least two of the cylinders such that the valve lift for the cam actuated intake valve associated with a first one of the cylinders is different than the valve lift for the cam actuated intake valve associated with a second one of the cylinders during a selected engine cycle, to thereby independently control an amount of air charge in the respective first and second cylinders during active working cycles that occur in the selected engine cycle; and wherein at first selected time during operation of the engine, a first set of cylinders are operated in the skip fire manner concurrently with a second set of cylinders being operated using the variable lift control; and at second selected times during operation of the engine, all of the cylinders in the first cylinder set are deactivated while the cylinders in the second cylinder set are operated using variable lift control.

2. The method of claim 1, wherein the internal combustion engine has an intake manifold, the intake manifold pressure being maintained substantially at a pressure selected from the group consisting of 75, 80, 85, 90 and 95 kPa.

3. The method of claim 1, wherein the internal combustion engine has no throttle.

4. The method of claim 1, wherein the engine has two banks of cylinders, the method further comprising:
operating a first one of the cylinder banks in using the skip fire operation; and
operating a second one of the cylinder banks using variable valve left control.

5. The method of claim 4, wherein the skip fire control and variable valve lift control work cooperatively to substantially maximize fuel efficiency.

6. An internal combustion engine comprising:
a plurality of cylinders arranged in a bank, each cylinder including at least one cam actuated intake valve, wherein at least one of the plurality of cylinders is capable of variable valve lift control, and at least one of the plurality of cylinders is capable of valve deactivation;
an engine controller configured to direct skip fire operation of the engine in accordance with a firing fraction that defines a first effective displacement of the engine, wherein during skip fire operation of the engine, for at least one of the cylinders, the cylinder is deactivated during selected skipped cylinder working cycles such that air is not pumped through the cylinder during the skipped cylinder working cycles and selected active cylinder working cycles are fueled and fired, the skipped and active working cycles being interspersed such that the one cylinder is fired, skipped and selectively either fired or skipped during successive work cycles in accordance with the firing fraction, while the engine is operating at the first effective displacement; and
wherein the engine controller is further configured to direct valve lift differently between the intake valves associated with at least two of the cylinders such that the valve lift for the cam actuated intake valve associated with a first one of the cylinders is different than the valve lift for the cam actuated intake valve associated with a second one of the cylinders during a selected engine cycle, to thereby independently control an amount of air charge in the respective first and second cylinders during active working cycles that occur in the selected engine cycle; and
wherein the engine controller is further configured to, at a first selected time during operation of the engine, direct operation of a first set of cylinders in the skip fire operation while concurrently directing operation of a second set of cylinders using a variable valve lift control with cylinders in the second set not being subject to the skip fire operation.

7. The internal combustion engine of claim 6, wherein the plurality of cylinders is at least 3 cylinders.

8. The internal combustion engine of claim 6, wherein the plurality of cylinders is 4 cylinders.

9. An internal combustion engine comprising:
a plurality of cylinders arranged in a bank, each cylinder including at least one cam actuated intake valve, wherein at least one of the plurality of cylinders is capable of variable valve lift control, and at least one of the plurality of cylinders is capable of valve deactivation;
an engine controller configured to direct skip fire operation of the engine in accordance with a firing fraction that defines a first effective displacement of the engine, wherein during skip fire operation of the engine, for at least one of the cylinders, the cylinder is deactivated during selected skipped cylinder working cycles such that air is not pumped through the cylinder during the skipped cylinder working cycles and selected active cylinder working cycles are fueled and fired, the skipped and active working cycles being interspersed such that the one cylinder is fired, skipped and selectively either fired or skipped during successive work cycles in accordance with the firing fraction, while the engine is operating at the first effective displacement; and
wherein the engine controller is further configured to direct valve lift differently between the intake valves associated with at least two of the cylinders such that the valve lift for the cam actuated intake valve associated with a first one of the cylinders is different than the valve lift for the cam actuated intake valve associated with a second one of the cylinders during a selected engine cycle, to thereby independently control an amount of air charge in the respective first and second cylinders during active working cycles that occur in the selected engine cycle; and
wherein the internal combustion engine has two cylinder banks, each cylinder bank including a plurality of cylinders;
all cylinders in a first one of the cylinder banks are capable of valve deactivation;
all of the cylinders in a second one of the cylinder banks are capable of variable valve lift control; and
the engine controller is configured to, at first selected time during operation of the engine, direct operation of the first cylinder bank in the skip fire operation concurrently with directing operation of the second cylinder bank using the variable valve lift control, and at second selected times during operation of the engine, cause deactivation of all of the cylinders in the first cylinder bank while concurrently directing operation of the cylinders in the second cylinder bank using the variable valve lift control.

10. The internal combustion engine of claim 9, wherein all cylinders in both the cylinder banks are capable of both valve deactivation and the variable valve lift control.

11. A method of operating an internal combustion engine having a plurality of cylinders arranged into two cylinder banks including a first cylinder bank and a second cylinder bank, each cylinder having at least one associated cam actuated intake valve, the method comprising:
directing skip fire operation of the cylinders in the first cylinder bank, wherein during the skip fire operation of the first cylinder bank selected active working cycles of the cylinders within the first cylinder bank are fueled and fired and selected skipped working cycles of the cylinders within the first cylinder bank are deactivated such that air is not pumped through the associated cylinders during the skipped cylinder working cycles, the skipped and active working cycles being interspersed such that each of the cylinders in the first cylinder bank is sometimes skipped and sometimes fired during the skip fire operation of the first cylinder bank; and directing variable valve lift control of the cylinders in the second cylinder bank, wherein the cylinders in the second cylinder bank are not operated in a skip fire manner;

the skip fire operation and the variable valve lift control being coordinated such that in first operating conditions, the first and second cylinder banks are operated simultaneously with the first cylinder bank being operated using the skip fire operation and the second cylinder bank being operated using the variable valve lift control; and in second operating conditions, only the second cylinder bank is operated, the second cylinder bank being operated using the variable valve lift control.

12. A method as recited in claim 11 wherein the cylinders in the first cylinder bank are not operated using variable valve left control.

13. A method as recited in claim 11 wherein each cylinder bank has an associated camshaft that carries a plurality of cams, each cam being arranged to actuate an associated one of the cam actuated intake valves in the associated cylinder bank.

14. A method as recited in claim 4 wherein:
at first selected time during operation of the engine, the first cylinder bank is operated in the skip fire operation concurrently with the second cylinder bank being operated using the variable valve lift control; and
at second selected times during operation of the engine, all of the cylinders in the first cylinder bank are deactivated while the cylinders in the second cylinder bank are operated using variable lift control.

15. A method as recited in claim 14 wherein cylinders in the first cylinder bank are not capable of variable valve lift control.

16. A method as recited in claim 14 wherein cylinders in the second cylinder bank are not capable of deactivation.

17. A method as recited in claim 1 wherein:
at a first selected time during operation of the engine, a first set of cylinders are operated in the skip fire operation concurrently with a second set of cylinders being operated using a variable valve lift control; and
at a second selected time during operation of the engine, all of the cylinders in the first cylinder set are deactivated while the cylinders in the second cylinder set are operated using the variable valve lift control.

18. The internal combustion engine as recited in claim 9 wherein cylinders in the first cylinder bank are not capable of variable lift control.

19. The internal combustion engine as recited in claim 9 wherein cylinders in the second cylinder bank are not capable of deactivation.

20. The internal combustion engine of claim 6 wherein the engine controller is further configured to, at second selected times during operation of the engine, cause deactivation of all of the cylinders in the first cylinder set while concurrently directing operation of the cylinders in the second cylinder set using the variable valve lift control.

* * * * *

UNITED STATES PATENT AND TRADEMARK OFFICE
CERTIFICATE OF CORRECTION

PATENT NO. : 10,233,796 B2
APPLICATION NO. : 14/705712
DATED : March 19, 2019
INVENTOR(S) : Shost et al.

Page 1 of 1

It is certified that error appears in the above-identified patent and that said Letters Patent is hereby corrected as shown below:

In the Claims

1. In Line 6 of Claim 4 (Column 13, Line 27) change "left" to --lift--.

2. In Line 3 of Claim 12 (Column 15, Line 29) change "left" to --lift--.

Signed and Sealed this
Eleventh Day of June, 2019

Andrei Iancu
*Director of the United States Patent and Trademark Office*